US012072259B2

(12) United States Patent
Park et al.

(10) Patent No.: US 12,072,259 B2
(45) Date of Patent: Aug. 27, 2024

(54) RESOLUTION MEASUREMENT APPARATUS AND RESOLUTION MEASUREMENT METHOD USING THE SAME

(71) Applicant: SAMSUNG DISPLAY CO., LTD., Yongin-si (KR)

(72) Inventors: Sanghui Park, Hwaseong-si (KR); Jinwook Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 342 days.

(21) Appl. No.: 17/367,785

(22) Filed: Jul. 6, 2021

(65) Prior Publication Data
US 2022/0065742 A1    Mar. 3, 2022

(30) Foreign Application Priority Data
Sep. 2, 2020 (KR) .................. 10-2020-0111939

(51) Int. Cl.
*G01M 11/02*  (2006.01)
*G02B 7/02*   (2021.01)
*G01N 21/17*  (2006.01)

(52) U.S. Cl.
CPC .......... *G01M 11/0207* (2013.01); *G02B 7/02* (2013.01); *G01N 2021/178* (2013.01)

(58) Field of Classification Search
CPC .. G01M 11/00; G01M 11/0207; G01M 11/04; G01M 11/0292; G02B 7/003; G02B 7/02; H10K 71/70; G01N 2021/178; G01N 2021/8816
See application file for complete search history.

(56) References Cited

U.S. PATENT DOCUMENTS

| | | | | |
|---|---|---|---|---|
| 5,268,735 A | * | 12/1993 | Hayashi | G11B 33/10 250/559.11 |
| 5,638,461 A | * | 6/1997 | Fridge | H04N 13/246 348/E13.016 |
| 5,855,074 A | * | 1/1999 | Abitbol | G01B 11/255 33/507 |
| 6,232,616 B1 | * | 5/2001 | Chen | G01M 11/00 356/244 |

(Continued)

FOREIGN PATENT DOCUMENTS

| | | |
|---|---|---|
| JP | 2007-065365 | 3/2007 |
| KR | 10-0909707 | 7/2009 |

(Continued)

*Primary Examiner* — Hwa Andrew Lee
(74) *Attorney, Agent, or Firm* — F. Chau & Associates, LLC

(57) ABSTRACT

A resolution measurement apparatus includes a stage configured to receive a display module including an optical part. The stage includes an opening that overlaps the optical part, when viewed in a plan view, when the display module is disposed on the stage. The resolution measuring apparatus further includes a plurality of cameras disposed above the stage, a light source disposed under the stage and overlapping the opening when viewed in the plan view, and a lens disposed between the light source and the stage. The lens overlaps the opening when viewed in the plan view, and the optical part overlaps the lens, when viewed in the plan view, when the display module is disposed on the stage.

18 Claims, 10 Drawing Sheets

(56) References Cited

U.S. PATENT DOCUMENTS

| | | | | |
|---|---|---|---|---|
| 6,590,643 B2* | 7/2003 | Kubota | ............... | G01J 1/4228 |
| | | | | 356/121 |
| 7,110,104 B2* | 9/2006 | Choi | ............... | G01N 21/8806 |
| | | | | 382/141 |
| 8,675,077 B2* | 3/2014 | Hill | ............... | H04N 17/002 |
| | | | | 348/335 |
| 8,842,288 B2* | 9/2014 | Ogawa | ............... | G01M 11/31 |
| | | | | 356/479 |
| 9,207,511 B2* | 12/2015 | Yamazaki | ............... | G02F 1/13458 |
| 10,670,802 B2* | 6/2020 | Chen | ............... | G02B 6/02204 |
| 10,824,838 B2* | 11/2020 | He | ............... | G02B 6/0046 |
| 2007/0001710 A1* | 1/2007 | Park | ............... | G09G 3/3611 |
| | | | | 324/750.19 |
| 2008/0204733 A1* | 8/2008 | Jones | ............... | G01N 33/12 |
| | | | | 356/237.1 |
| 2015/0118767 A1* | 4/2015 | Sugiyama | ............... | H10K 71/70 |
| | | | | 438/16 |
| 2019/0323920 A1* | 10/2019 | Smorgon | ............... | G01M 11/0228 |
| 2020/0120245 A1* | 4/2020 | Nakamura | ............... | G02B 27/288 |

FOREIGN PATENT DOCUMENTS

| | | |
|---|---|---|
| KR | 10-0950270 | 3/2010 |
| KR | 10-1338339 | 12/2013 |
| KR | 10-1601131 | 3/2016 |

* cited by examiner

RESOLUTION MEASUREMENT APPARATUS AND RESOLUTION MEASUREMENT METHOD USING THE SAME

CROSS-REFERENCE TO RELATED APPLICATIONS

This U.S. non-provisional patent application claims priority under 35 U.S.C. § 119 to Korean Patent Application No. 10-2020-0111939, filed on Sep. 2, 2020, the disclosure of which is incorporated by reference herein in its entirety.

TECHNICAL FIELD

Embodiments of the present inventive concept relate to a resolution measurement apparatus and a method for measuring the resolution using the same.

DISCUSSION OF RELATED ART

Electronic apparatuses such as, for example, smartphones, digital cameras, laptop computers, navigation devices, smart televisions, etc., which provide images to users, may include display devices. The display devices may generate images and provide the images to users via display screens.

Such display devices may include a display panel including a plurality of pixels for generating an image, a drive part for driving the pixels, and functional elements for providing various functions to a user. The functional elements may include, for example, a speaker, a camera, a sensor, etc. A plurality of holes may be defined in such a display device, and the functional elements may be disposed in the holes.

SUMMARY

Embodiments of the present inventive concept provide a resolution measurement apparatus for measuring the resolution of an optical part of a display module and a method for measuring the resolution of the optical part using the same.

According to an embodiment of the inventive concept, a resolution measurement apparatus includes a stage configured to receive a display module including an optical part. The stage includes an opening that overlaps the optical part, when viewed in a plan view, when the display module is disposed on the stage. The measurement apparatus further includes a plurality of cameras disposed above the stage, and a light source disposed under the stage. The light source overlaps the opening when viewed in the plan view. The resolution measurement apparatus further includes a lens disposed between the light source and the stage. The lens overlaps the opening when viewed in the plan view. The optical part overlaps the lens, when viewed in the plan view, when the display module is disposed on the stage.

According to an embodiment of the inventive concept, a resolution measurement method includes disposing a display module on a stage. An optical part of the display module overlaps an opening of the stage when viewed in a plan view. The method further includes overlapping the optical part with a lens disposed under the stage, generating a light from a light source disposed under the lens, providing the light to a plurality of cameras disposed above the stage through the lens and the optical part, and measuring a resolution of the optical part by using information captured through the cameras.

BRIEF DESCRIPTION OF THE DRAWINGS

The above and other features of the present inventive concept will become more apparent by describing in detail embodiments thereof with reference to the accompanying drawings, in which.

DETAILED DESCRIPTION

Figure 1:
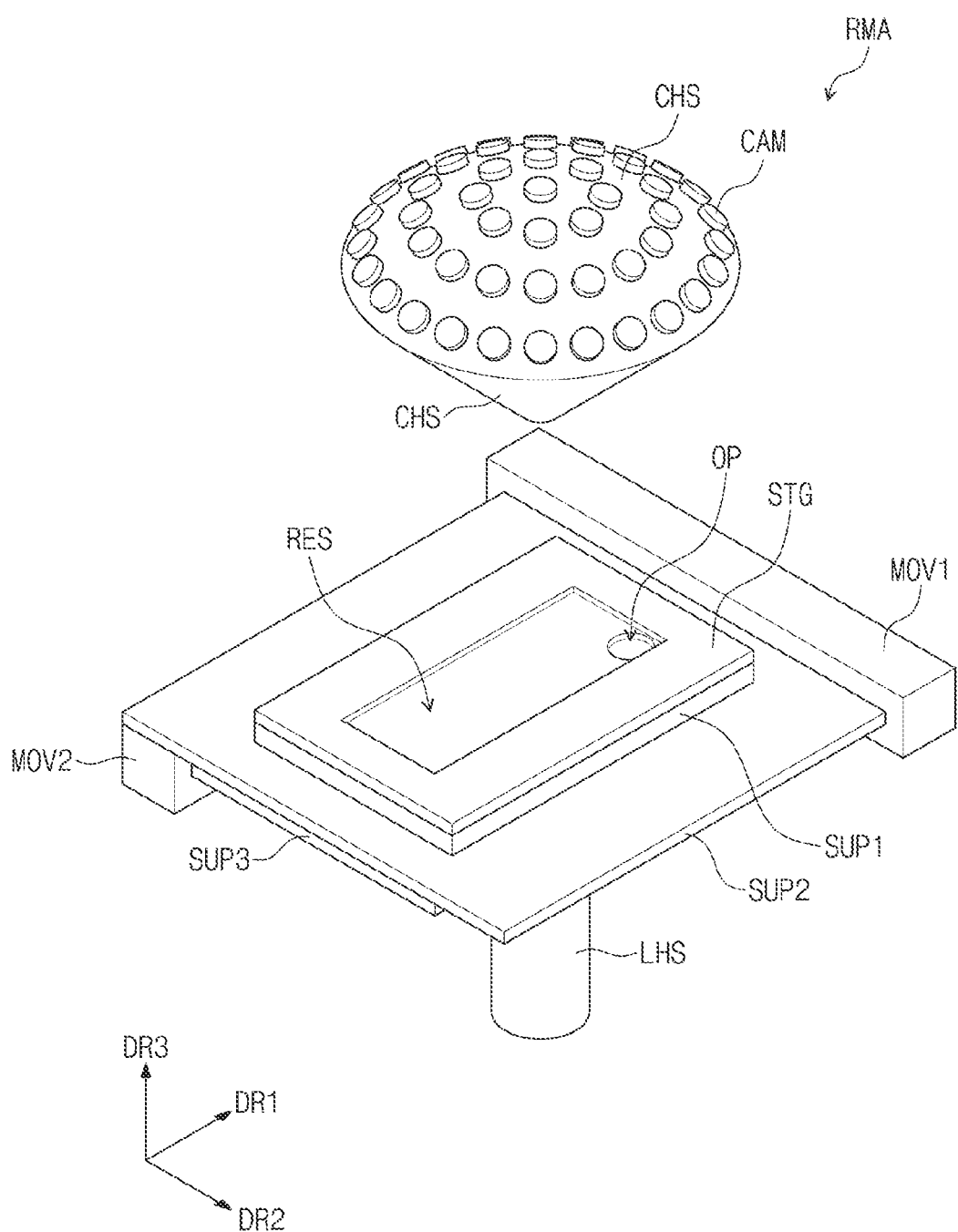
FIG. 1 is a perspective view of a resolution measurement apparatus according to an embodiment of the inventive concept.

Embodiments of the present inventive concept will be described more fully hereinafter with reference to the accompanying drawings. Like reference numerals may refer to like elements throughout the accompanying drawings.

In this description, it will be understood that when an element (or a region, a layer, portion, etc.) is referred to as being "on", "connected to" or "coupled to" another element or layer, it can be directly on, connected or coupled to the other element, or a third intervening element may be present therebetween. Other words used to describe the relationships between elements (e.g., "between", "adjacent", etc.) should be interpreted in a like fashion.

The term "and/or" includes all of one or more combinations that can be defined by associated items.

Although the terms such as "first" and "second" may be used herein to describe various elements, these elements should not be limited by these terms. The terms are only used to distinguish one element from other elements. For example, without departing from the scope of the present inventive concept, a first component may be referred to as a second component, and similarly, the second component may also be referred to as the first component. Singular forms may include plural forms unless clearly defined otherwise in context.

In addition, terms such as "under", "below", "on", "above", etc. may be used to describe the relationship between elements illustrated in the figures. The terms have relative concepts, and are described with respect to directions illustrated in the figures.

It should be further understood that the terms "include" or "have", when used in this specification, specify the presence of stated features, numbers, steps, operations, elements, components or combinations thereof, but do not preclude the presence or addition of one or more other features, numbers, steps, operations, elements, components, and/or combinations thereof.

FIG. 1 is a perspective view of a resolution measurement apparatus according to an embodiment of the inventive concept.

Referring to FIG. 1, in an embodiment, a resolution measurement apparatus RMA includes a stage STG, a first support part SUP1, a second support part SUP2, a third support part SUPS, a lens housing LHS, a plurality of cameras CAM, a first movement part MOV1, and a second movement part MOV2.

The stage STG may have a plane defined by a first direction DR1 and a second direction DR2 crossing the first direction DR1. Hereinafter, a direction crossing the plane defined by the first and second directions DR1 and DR2 in a substantially perpendicular (e.g., exactly perpendicular, or approximately perpendicular, within a measurement error, as would be understood by one having ordinary skill in the art) manner is defined as a third direction DR3. In this description, "when viewed in a plan view" may refer to being viewed in the third direction DR3.

A recess RES may be defined in an upper surface of the stage STG. The recess RES may be formed such that the upper surface of the stage STG is recessed a predetermined depth toward the lower surface of the stage. An opening OP may be defined in the stage STG. When viewed in a plan view, the opening OP may be disposed in the recess RES and overlap the recess RES.

The first support part SUP1 may be disposed under the stage STG. The first support part SUP1 may support the stage STG. When viewed in a plan view, the periphery of the first support part SUP1 may overlap the periphery of the stage STG. However, embodiments of the inventive concept are not limited thereto. For example, according to embodiments, the periphery of the first support part SUP1 may be disposed outside the periphery of the stage STG.

The second support part SUP2 may be disposed under the first support part SUP1. The second support part SUP2 may support the first support part SUP1. When viewed in a plan view, the second support part SUP2 may have a greater area than the first support part SUP1. In addition, when viewed in a plan view, the periphery of the second support part SUP2 may be disposed outside the first support part SUP1.

The third support part SUP3 may be disposed under the second support part SUP2. The third support part SUP3 may support the second support part SUP2. When viewed in a plan view, the third support part SUP3 may have a smaller area than the second support part SUP2.

The lens housing LHS extending in the third direction DR3 may be disposed under the third support part SUP3. A lens and a light source may be disposed in the lens housing LHS. The lens and the light source will be described in detail with reference to FIG. 2. The lens housing LHS may have a cylindrical shape extending in the third direction.

The camera housing CHS may be disposed above the stage STG. The camera housing CHS may have a fan shape extending between a lower portion of the camera housing CHS and an upper portion of the camera housing CHS. Accordingly, the upper surface of the camera housing CHS may have an upwardly convex curved surface. That is, the upper surface of the camera housing CHS may be convex in the third direction DR3.

The cameras CAM may be disposed above the stage STG. The cameras CAM may be disposed along the upper surface of the camera housing CHS and accommodated in the camera housing CHS.

The first movement part MOV1 and the second movement part MOV2 may move the stage STG in the first and second directions DR1 and DR2. For example, the first movement part MOV1 may extend in the second direction DR2, and may be connected to a side surface of the second support part SUP2, the side surface extending in the second direction DR2. The second movement part MOV2 may extend in the first direction DR1, and may be connected to a lower portion of a side surface of the second support part SUP2, the side surface extending in the first direction DR1.

The first movement part MOV1 may move in the second direction DR2, and the second movement part MOV may move in the first direction DR1. According to the movement of the first movement part MOV1, the first, second, and third support parts SUP1, SUP2, and SUP3 and the stage STG may move in the second direction DR2. According to the movement of the second movement part MOV2, the first, second, and third support parts SUP1, SUP2, and SUP3 and the stage STG may move in the first direction DR1.

In an embodiment, the first movement part MOV1 and the second movement part MOV2 may be moved by a motor. For example, in an embodiment, the first movement part MOV1 and the second movement part MOV2 may be motorized.

Figure 2:
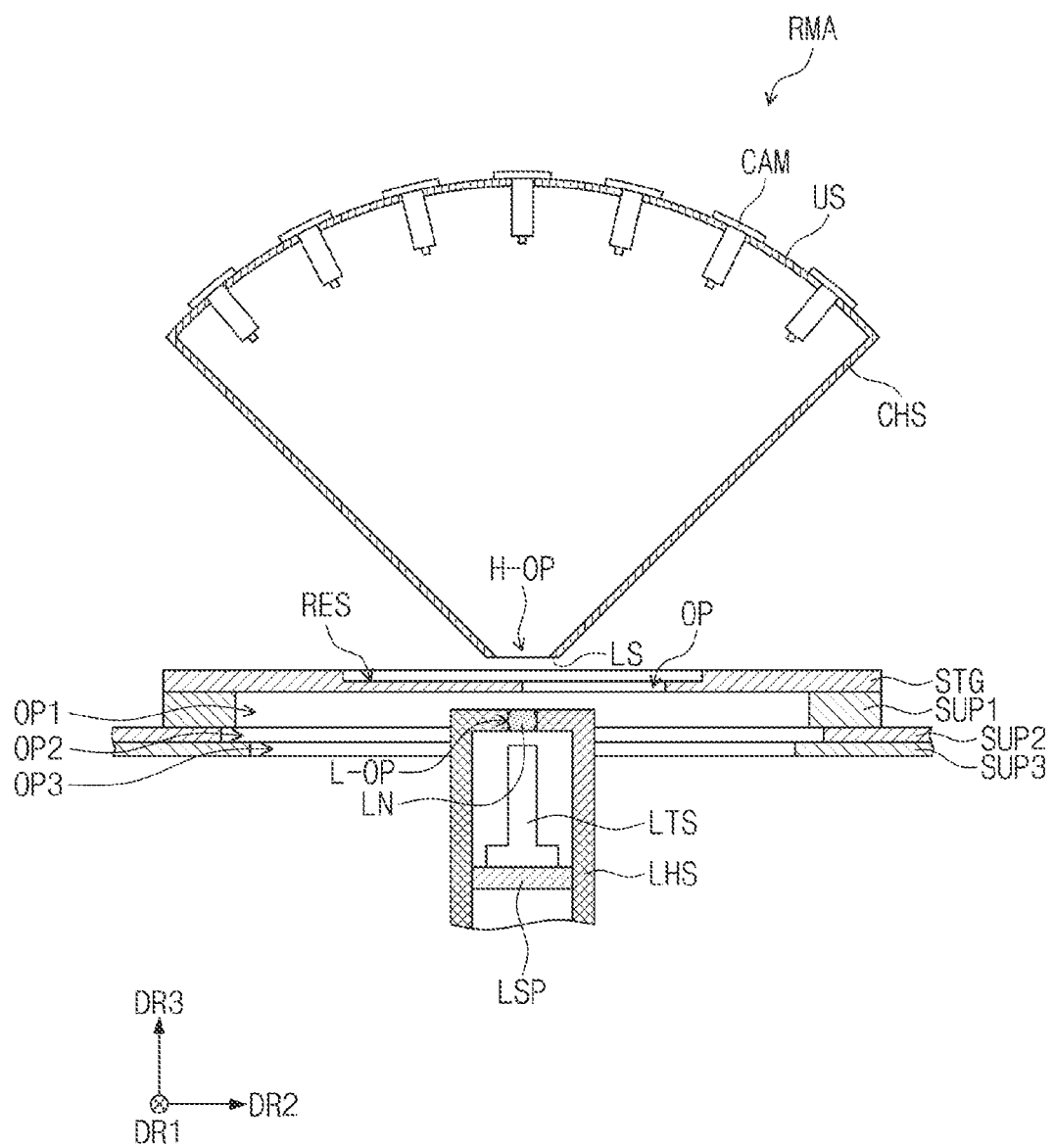
FIG. 2 is a view for illustrating a cross-section of the resolution measurement apparatus illustrated in FIG. 1 according to an embodiment of the inventive concept.

FIG. 2 is a view illustrating a cross-section of the resolution measurement apparatus illustrated in FIG. 1 according to an embodiment of the inventive concept.

FIG. 2 illustrates a cross-section of the resolution measurement apparatus when viewed in the first direction DR1.

Referring to FIG. 2, the recess RES and the opening OP may be defined in the stage STG. A display module may be disposed in the recess RES. The stage STG on which the display module is disposed will be described in detail with reference to FIG. 9.

The first support part SUP1 may be disposed under the stage STG along a periphery of the stage STG. A first opening OP1 may be defined in the first support part SUP1. When viewed in a plan view, the first opening OP1 may overlap the recess RES. When viewed in a plan view, the first opening OP1 may have a greater area then the recess RES.

A second opening OP2 may be defined in the second support part SUP2 disposed under the first support part SUP1. When viewed in a plan view, the second opening OP2 may overlap the recess RES. When viewed in a plan view, the second opening OP2 may have a greater area then the recess RES.

A third opening OP3 may be defined in the third support part SUP3 disposed under the second support part SUP2. When viewed in a plan view, the third opening OP3 may overlap the recess RES. When viewed in a plan view, the third opening OP3 may have a greater area then the recess RES.

The resolution measurement apparatus RMA may include a lens LN and a light source LTS accommodated in the lens housing LHS. The lens LN may be defined as an imaging lens. The light source LTS may generate light.

The lens housing LHS may be disposed under the stage STG. When viewed in a plan view, the lens housing LHS may overlap the first, second, and third support parts SUP1, SUP2, and SUP3. The first, second, and third openings OP1, OP2, and OP3 may be disposed in the lens housing LHS.

The lens LN and the light source LTS may be disposed under the stage STG. The lens LN may be disposed between the light source LTS and the stage STG. The lens LN may be disposed on the upper end of the lens housing LHS. An opening L-OP in which the lens LN is disposed may be defined in the upper end of the lens housing LHS. The lens LN may be disposed in the opening L-OP and fixed to the upper end of the lens housing LHS.

The light source LTS may be disposed inside the lens housing LHS. The light source LTS may be disposed inside the lens LN. A light source support part LSP that supports the light source LTS may be disposed inside the lens housing LHS.

The camera housing CHS may have a fan shape and be disposed above the stage STG. The upper surface US of the camera housing CHS may have a fan-like curved surface. A lower surface of the camera housing CHS may be defined as the lower end of the camera housing CHS and be open toward the stage STG. That is, an opening H-OP may be defined in the lower surface LS of the camera housing CHS.

The cameras CAM may be disposed along the upper surface US of the camera housing CHS and accommodated in the camera housing CHS. For example, the upper portions of the cameras CAM may be connected to the upper surface US of the camera housing CHS, and other portions of the cameras CAM may be accommodated in the camera housing CHS.

When viewed in a plan view, the lens LN may overlap the lower surface LS of the camera housing CHS. For example, when viewed in a plan view, the lens LN may overlap the opening H-OP defined in the lower surface LS of the camera housing CHS.

In an embodiment, lower portions of the cameras CAM may be disposed toward the lower surface LS of the camera housing CHS. For example, the lower portions of the cameras CAM may be disposed toward the opening H-OP. Accordingly, the lenses of the cameras CAM disposed in the lower portions of the cameras CAM may be disposed toward the opening H-OP. For example, the lenses of the cameras CAM may face the opening H-OP, and may face an optical part OPP of a display module DM, which is described further below.

Figure 3:
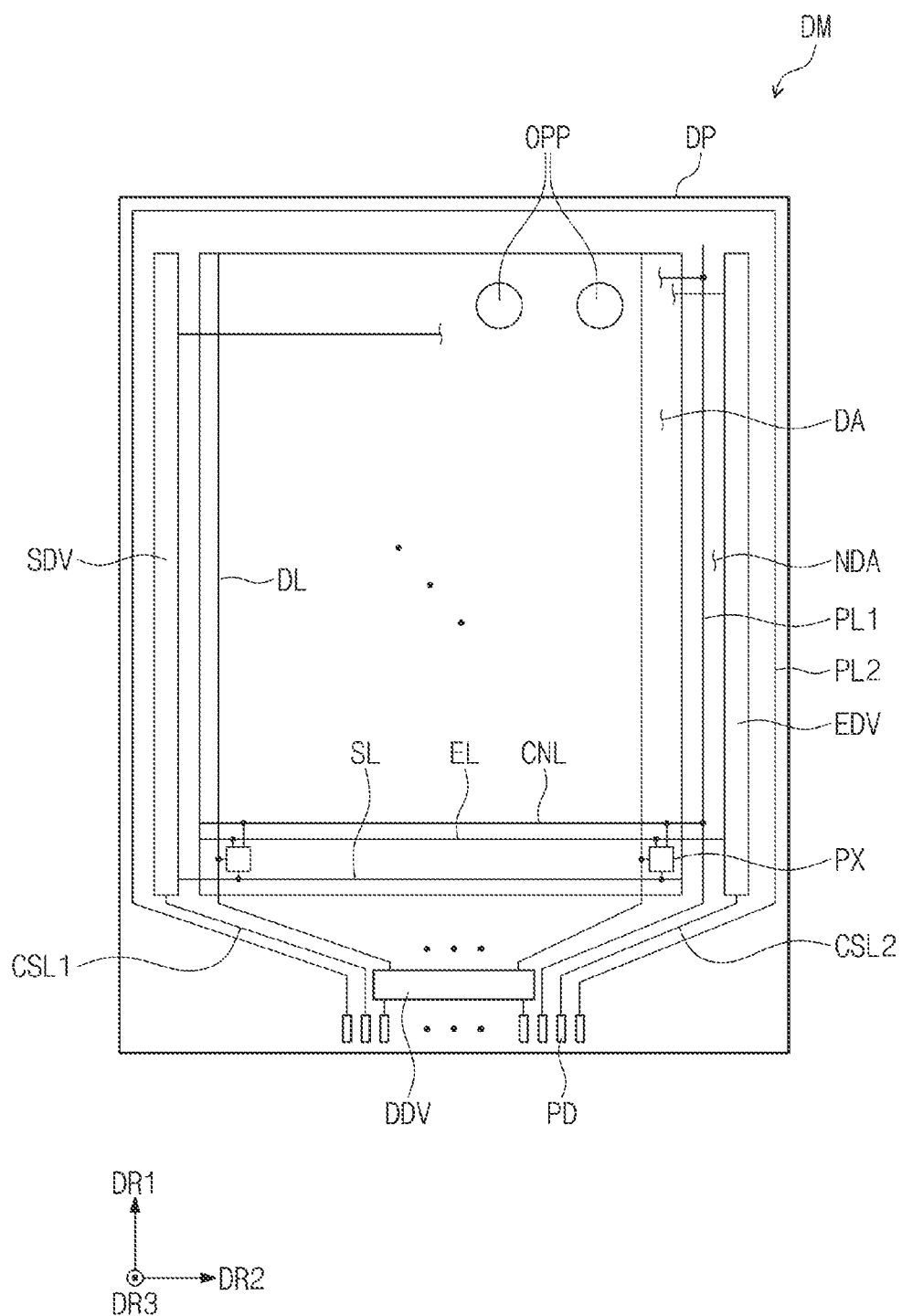
FIG. 3 is a plan view of a display module that may be disposed in a recessed part of a stage illustrated in FIG. 2 according to an embodiment of the inventive concept.

FIG. 3 is a plan view of a display module that may be disposed in the recess part of the stage illustrated in FIG. 2 according to an embodiment of the inventive concept.

Referring to FIG. 3, a display module DM may include a display panel DP, a scan driver SDV, a data driver DDV, and an emission driver EDV. The display panel DP may have a rectangular shape that has long sides extending in the first direction DR1 and short sides extending in the second direction DR2. However, the shape of the display panel DP is not limited thereto.

The display panel DP may include a plurality of optical parts OPP, a display region DA around each of the optical parts OPP, and a non-display region NDA around the display region DA. Although the display panel DP in FIG. 3 is illustrated as including two optical parts OPP, embodiments of the inventive concept are not limited thereto. For example, according to embodiments, the display panel DP may include one optical part OPP or may include more than two optical parts OPP. The display region DA may surround each of the optical parts OPP. For example, each of the optical parts OPP may be entirely surrounded by the display region DA. The non-display region NDA may surround the display region DA. For example, the display region DA may be entirely surrounded by the non-display region NDA.

For example, the optical parts OPP may each have a circular shape. However, the shapes of the optical parts are not limited thereto. Functional elements may be disposed under the optical parts OPP. The functional elements will be described in detail with reference to FIG. 4. In an embodiment, the optical parts OPP are adjacent to the upper side and the right side of the display region DA. However, the disposition positions of the optical parts OPP are not limited thereto. In an embodiment, two optical parts OPP are included. However, the number of the optical parts OPP is not limited thereto.

The display panel DP may include a plurality of pixels PX, a plurality of scan lines SL, a plurality of data lines DL, a plurality of emission lines EL, first and second control lines CSL1 and CSL2, first and second power lines PL1 and PL2, connection lines CNL, and a plurality of pads PD.

The pixels PX may be disposed in the display region DA. The scan driver SDV and the emission driver EDV may be disposed in the non-display regions NDA adjacent to the respective long sides of the display panel DP. The data driver DDV may be disposed in the non-display region NDA adjacent to any one short side among the short sides of the display panel DP. When viewed in a plan view, the data driver DDV may be adjacent to the lower end of the display panel DP. The data driver DDV may be manufactured as an integrated circuit chip and mounted on the display panel DP.

The scan lines SL may extend in the second direction DR2 and be connected to the pixels PX and the scan driver SDV. The data lines DL may extend in the first direction DR1 and be connected to the pixels PX and the data driver DDV. The emission lines EL may extend in the second direction DR2 and be connected to the pixels PX and the emission driver EDV.

The first power line PL1 may extend in the first direction DR1 and be disposed in the non-display region NDA. The first power line PL1 may be disposed between the display region DA and the emission driver EDV. However, embodiments of the inventive concept are not limited thereto. For example, according to embodiments, the first power line PL1 may be disposed between the display region DA and the scan driver SDV.

The connection lines CNL may extend in the second direction DR2, be arranged in the first direction DR1, and be connected to the first power line PL1 and the pixels PX. A first voltage may be applied to the pixels PX through the first power line PL1 and the connection lines CNL which are connected to each other.

The second power line PL2 may be disposed in the non-display region NDA. The second power line PL2 may extend along the long sides of the display panel DP and along another short side of the display panel DP at which the data driver DDV is not disposed. The second power line PL2 may be disposed closer to the outer periphery than the scan driver SDV and the emission driver EDV.

The second power line PL2 may extend toward the display region DA and be connected to the pixels PX. A second voltage having a lower level than the first voltage may be applied to the pixels PX through the second power line PL2.

The first control line CSL1 may be connected to the scan driver SDV and extend toward the lower end of the display panel DP. The second control line CSL2 may be connected to the emission driver EDV and extend toward the lower end of the display panel DP. The data driver DDV may be disposed between the first control line CSL1 and the second control line CSL2.

The pads PD may be disposed on the display panel DP and may be adjacent to the lower end of the display panel DP. The data driver DDV, the first power line PL1, the second power line PL2, the first control line CSL1, and the second control line CSL2 may be connected to the pads PD. The data lines DL may be connected to the data driver DDV, and the data driver DDV may be connected to the pads PD corresponding to the data lines DL.

In an embodiment, the pads PD may be connected to a printed circuit board. In addition, a timing controller for controlling the operations of the scan driver SDV, the data driver DDV, and the emission driver EDV, and a voltage generation part for generating the first and second voltages, may be disposed on the printed circuit board. The timing controller and the voltage generation part may be connected to the pads PD through the printed circuit board.

The scan driver SDV may generate a plurality of scan signals, and the scan signals may be applied to the pixels PX through the scan lines SL. The data driver DDV may generate a plurality of data voltages, and the data voltages may be applied to the pixels PX through the data lines DL. The emission driver EDV may generate a plurality of light-emitting signals, and the light-emitting signals may be applied to the pixels PX through the emission lines EL.

The pixels PX may receive data voltages in response to receiving the scan signals. The pixels PX may emit light having a luminance corresponding to the data voltages in response to receiving the light-emitting signals. The emission time of the pixels PX may be controlled by the light-emitting signals.

Figure 4:
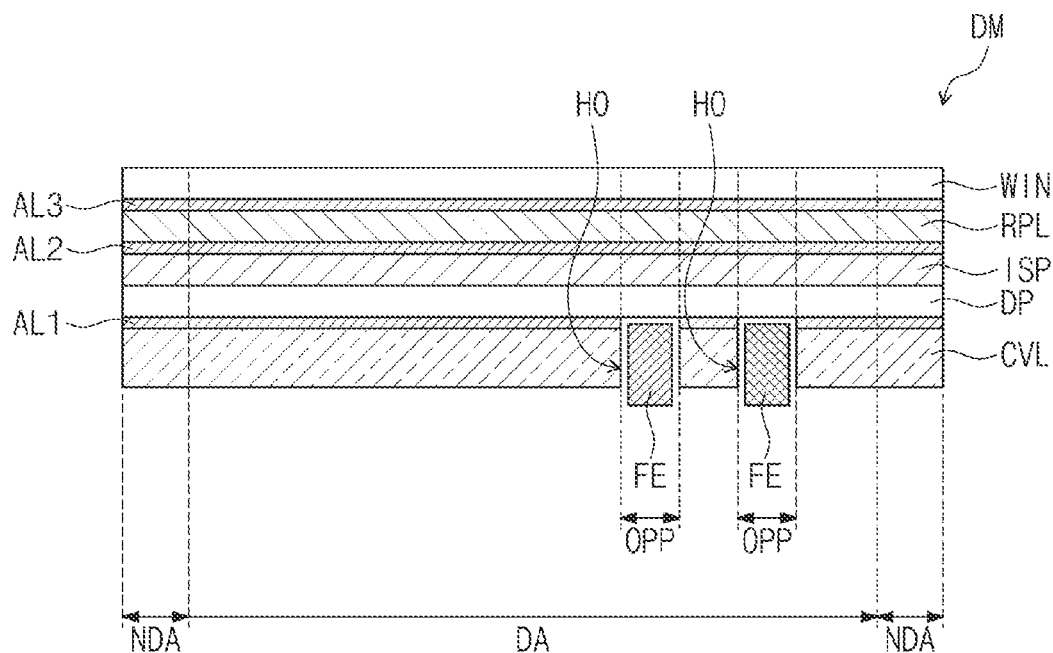
FIG. 4 is a cross-sectional view of the display module illustrated in FIG. 3 according to an embodiment of the inventive concept.
Figure 4:
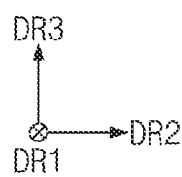

FIG. 4 is a cross-sectional view of the display module illustrated in FIG. 3 according to an embodiment of the inventive concept.

FIG. 4 illustrates a cross-section of the display module DM when viewed in the first direction DR1 according to an embodiment of the inventive concept.

Referring to FIG. 4, the display module DM may include the display panel DP, an input sensing part ISP, a reflection prevention layer RPL, a window WIN, a cover layer CVL, first to third adhesive layers AL1, AL2 and AL3, and functional elements FE. As described above, the display panel DP may include the optical parts OPP, the display region DA around each of the optical parts OPP, and the non-display region NDA around the display region DA.

The display panel DP may be a flexible display panel. The display panel DP according to an embodiment of the inventive concept may be, for example, a light-emitting display panel. However, embodiments of the inventive concept are not limited thereto. For example, according to embodiments, the display panel DP may be an organic light-emitting display panel or a quantum dot light-emitting display panel. A light-emitting layer of the organic light-emitting display panel may include an organic light-emitting material. The light-emitting layer of the quantum dot light-emitting display panel may include, for example, quantum dots, quantum rods, etc. Hereinafter, the display panel DP will be described as being an organic light-emitting display panel. However, the display panel DP is not limited thereto.

The input sensing part ISP may be disposed on the display panel DP. The input sensing part ISP may include a plurality of sensor parts for sensing external inputs. The sensing parts may sense external inputs through, for example, an electrostatic capacitive method. The input sensing part ISP may be manufactured directly on the display panel DP when manufacturing the display panel DP. However, embodiments of the inventive concept are not limited thereto. For example, according to embodiments, the input sensing part ISP may also be manufactured as a separate panel and attached to the display panel DP.

The reflection prevention layer RPL may be, for example, an external light reflection prevention film. The reflection prevention layer RPL may decrease the reflectivity of the external light incident to the display panel DP from above the display module DM.

When external light propagated toward the display panel DP is reflected by the display panel DP and is provided again to an external user, a mirror effect may occur due to the external light. To prevent or reduce such a phenomenon, the reflection prevention layer RPL may include, for example, a plurality of color filters that display the same color as the pixels.

The color filters may filter the external light into the same colors as the pixels. In this case, the external light may not be visible by the user. However, embodiments of the inventive concept are not limited to utilizing color filters to decrease reflectivity of the external light. For example, according to embodiments, the reflection prevention layer RPL may include a retarder and/or a polarizer to reduce the reflectivity of external light.

The window WIN may be disposed on the reflection prevention layer RPL. The window WIN may protect the display panel DP, the input sensing part ISP, and the reflection prevention layer RPL from, for example, external scratches, shocks, impact, etc. The window WM may have an optically transparent property.

The cover layer CVL may be disposed under the display panel DP. The cover layer CVL may absorb an external shock applied to a lower portion of the display panel DP, and thus, may protect the display panel DP. The cover layer CVL may include, for example, a cushion layer, which may include, for example, a foam sheet having predetermined elasticity.

The first adhesive layer AL1 may be disposed between the display panel DP and the cover layer CVL. The display panel DP and the cover layer CVL may be adhered to each other by the first adhesive layer AL1. The second adhesive layer AL2 may be disposed between the reflection prevention layer RPL and the input sensing part ISP. The reflection prevention layer RPL and the input sensing part ISP may be adhered to each other by the second adhesive layer AL2. The third adhesive layer AL3 may be disposed between the window WIN and the reflection prevention layer RPL. The window WIN and the reflection prevention layer RPL may be adhered to each other by the third adhesive layer AL3.

The functional elements FE may be disposed under the optical parts OPP. When viewed in a plan view, holes HO may be defined in an optical part OPP that overlaps a portion of the cover layer CVL. The functional elements FE may be disposed in the holes HO. In an embodiment, the functional elements FE may include cameras embedded in a display device. External light may be provided to the functional elements FE through the window WIN. External light may be provided to the functional elements FE through the optical parts OPP.

The optical parts OPP may display an image. In addition, the optical parts OPP may transmit external light and provide the external light to the functional elements FE. Such a configuration will be described in detail with reference to FIGS. 6 to 8.

The resolution measurement apparatus RMA illustrated in FIG. 1 may measure the resolutions of the optical parts OPP.

According to embodiments, when the resolution measurement apparatus RMA measures the resolutions of the optical parts OPP, the functional elements FE are not disposed under the optical parts OPP.

Figure 5:
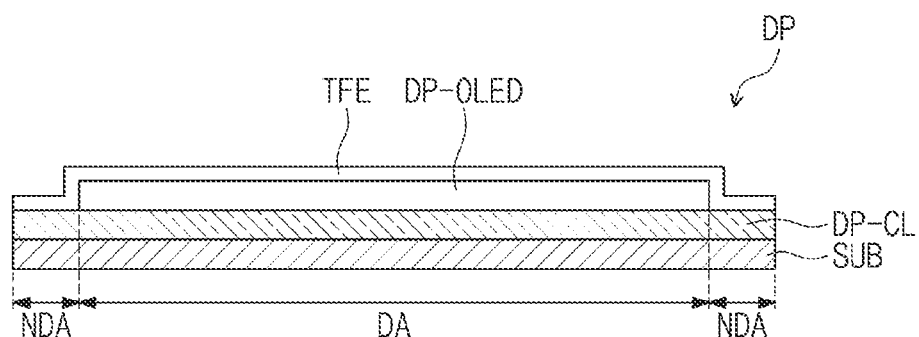
FIG. 5 is a view illustrating a cross-section of a display panel illustrated in FIG. 4 according to an embodiment of the inventive concept.
Figure 5:
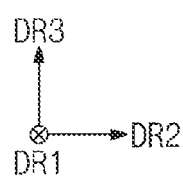

FIG. 5 is a view illustrating a cross-section of the display panel illustrated in FIG. 4 according to an embodiment of the inventive concept.

Referring to FIG. 5, a display panel DP may include a substrate SUB, a circuit element layer DP-CL disposed on the substrate SUB, a display element layer DP-OLED disposed on the circuit element layer DP-CL, and a thin-film encapsulation layer TFE disposed on the display element layer DP-OLED.

The substrate SUB may include the display region DA and the non-display region NDA around the display region DA. The substrate SUB may include, for example, a flexible plastic material. For example, the substrate SUB may include polyimide (PI).

The display element layer DP-OLED may be disposed in the display region DA. The thin film encapsulation layer TFE, may be disposed on the circuit element layer DP-CL so as to cover the display element layer DP-OLED. A plurality of pixels may be disposed on the circuit element layer DP-CL and the display element layer DP-OLED. For example, the pixels may each include a transistor disposed on the circuit element layer DP-CL, and a light-emitting element disposed on the display element layer DP-OLED and connected to the transistor.

Figure 6:
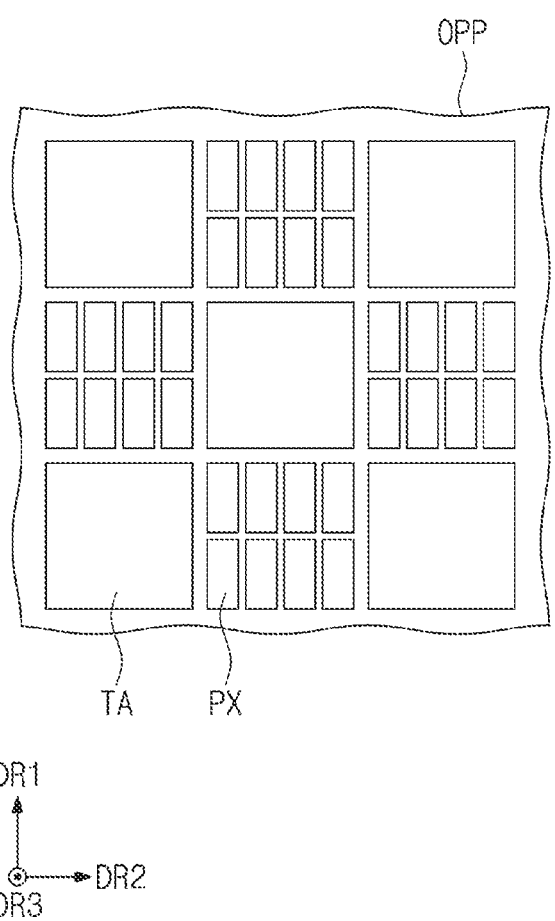
FIG. 6 is a view illustrating a portion of an optical part illustrated in FIG. 3 according to an embodiment of the inventive concept.

FIG. 6 is a view illustrating a portion of the optical part illustrated in FIG. 3 according to an embodiment of the inventive concept.

Referring to FIG. 6, the optical part OPP may include a plurality of transmissive regions TA and a plurality of pixels PX between the transmissive regions TA. The pixels PX may have the same configuration as the pixels disposed in the display region DA. The pixels PX and the transmissive regions TA may be arranged in the first direction DR1 and the second direction DR2. However, the arrangement of the pixels PX and the transmissive regions TA is not limited thereto. The pixels PX may display an image and the transmissive regions TA may transmit external light.

Figure 7:
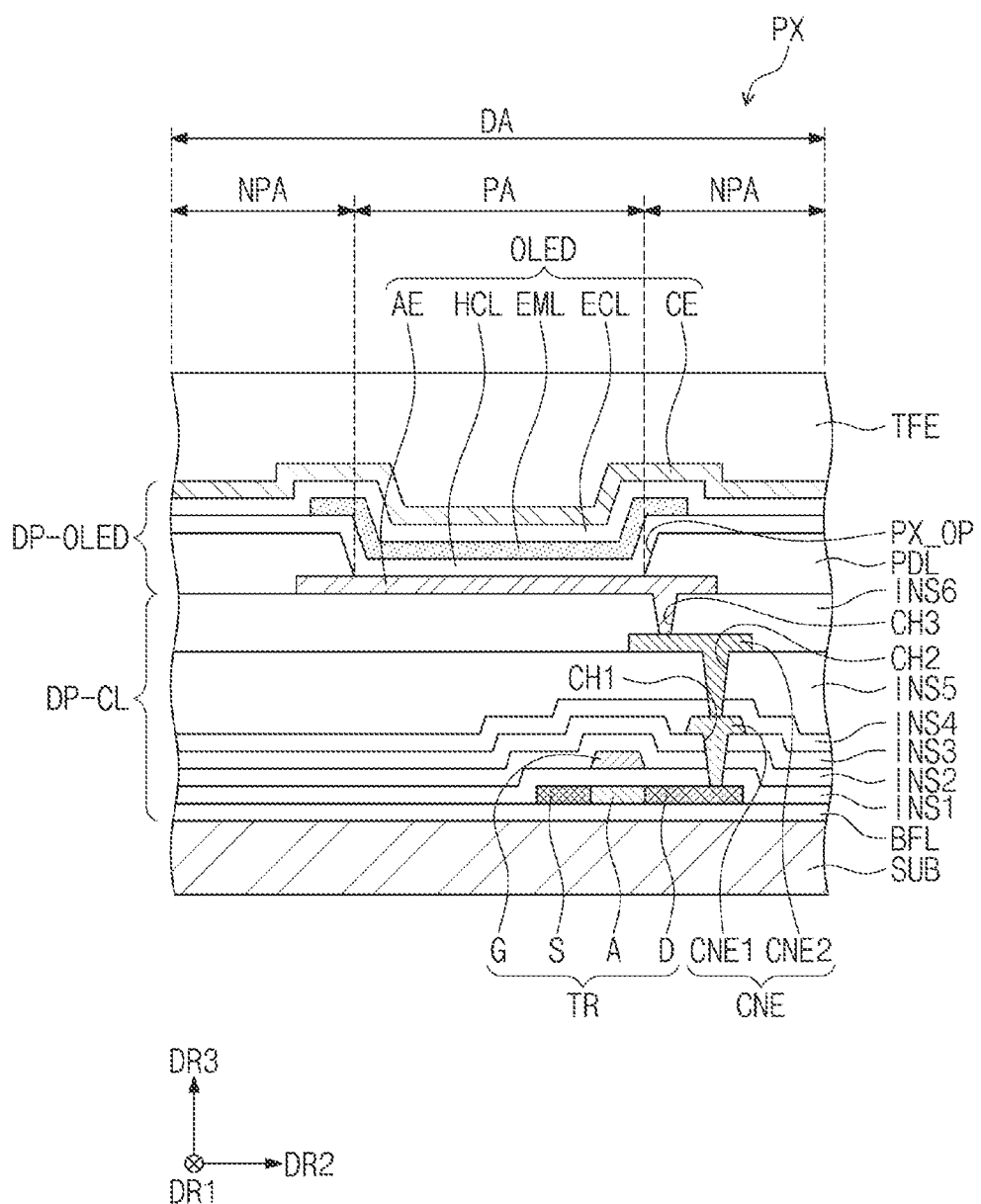
FIG. 7 is a view illustrating a cross-section of any one pixel disposed in a display region illustrated in FIG. 3 according to an embodiment of the inventive concept.

FIG. 7 is a view illustrating a cross-section of any one pixel disposed in the display region illustrated in FIG. 3 according to an embodiment of the inventive concept.

Referring to FIG. 7, the pixel PX may be disposed on the substrate SUB, and include a transistor TR and a light-emitting element OLED. The light-emitting element OLED may include a first electrode AE, a second electrode CE, a hole control layer HCL, an electron control layer ECL, and an emission layer EML. The first electrode AE may be an anode electrode, and the second electrode may be a cathode electrode.

The transistor TR and the light-emitting element OLED may be disposed on the substrate SUB. Although FIG. 7 illustrates a single transistor TR, embodiments of the inventive concept are not limited thereto. For example, according to embodiments, the pixel PX may include a plurality of transistors and at least one capacitor, which may drive the light-emitting element OLED.

The display region DA may include a light-emitting region PA corresponding to the pixel PX and a non-light-emitting region NPA around the light-emitting region PA. The light-emitting element OLED may be disposed in the light-emitting region PA.

The substrate SUB may include, for example, a flexible plastic substrate. For example, the substrate SUB may include transparent polyimide. A buffer layer BFL may be disposed on the substrate SUB. The buffer layer BFL may be, for example, an inorganic layer. A semiconductor pattern may be disposed on the buffer layer BFL. The semiconductor pattern may include, for example, polysilicon. However, embodiments of the inventive concept are not limited thereto. For example, according to embodiments, the semiconductor pattern may include amorphous silicon or a metal oxide.

The semiconductor pattern may be doped with N-type dopants or P-type dopants. The semiconductor pattern may include a highly doped region and a slightly doped region. The conductivity of the highly doped region may be greater than that of the slightly doped region, and may substantially function as the source electrode and the drain electrode of the transistor TR. The slightly doped region may substantially correspond to the active region (or channel) of the transistor.

The source S, the active region A, and the drain D of the transistor TR may be formed from the semiconductor pattern. A first insulating layer INS1 may be disposed on the semiconductor pattern. A gate G of the transistor TR may be disposed on the first insulating layer INS1. A second insulating layer INS2 may be disposed on the gate G. A third insulating layer INS3 may be disposed on the second insulating layer INS2.

A connection electrode CNE may be disposed between the transistor TR and the light-emitting element OLED and connect the transistor TR and the light-emitting element OLED. The connection electrode CNE may include a first connection electrode CNE1 and a second connection electrode CNE2.

The first connection electrode CNE1 may be disposed on the third insulating layer INS3, and connected to the drain D through a first contact hole CH1 extending through the first to third insulating layers INS1 to INS3. A fourth insulating layer INS4 may be disposed on the first connection electrode CNE1. A fifth insulating layer INS5 may be disposed on the fourth insulating layer INS4.

The second connection electrode CNE2 may be disposed on the fifth insulating layer INS5. The second connection electrode CNE2 may be connected to the first connection electrode CNE1 through a second contact hole CH2 extending through the fifth insulating layer INS5. A sixth insulating layer INS6 may be disposed on the second connection electrode CNE2. The first insulating layer INS1 to the sixth insulating layer INS6 may be, for example, inorganic layers or organic layers.

The first electrode AE may be disposed on the sixth insulating layer INS6. The first electrode AE may be connected to the second connecting electrode CNE2 through a third contact hole CH3 extending through the sixth insulating layer INS6. A pixel defining film PDL that exposes a predetermined portion of the first electrode AE may be disposed on the first electrode AE and the sixth insulating layer INS6. In the pixel defining film PDL, an opening PX_OP that exposes a predetermined portion of the first electrode AE may be defined.

The hole control layer HCL may be disposed on the first electrode AE and on the pixel defining film PDL. The hole control layer HCL may be commonly disposed in the light-emitting region PA and the non-light-emitting region NPA. The hole control layer HCL may include, for example, a hole transportation layer and a hole injection layer.

The emission layer EML may be disposed on the hole control layer HCL. The emission layer EML may be disposed in a region corresponding to the opening PX_OP. The emission layer EL may include, for example, an organic material or an inorganic material. The emission layer EML may generate any one of, for example, red, green, and blue light.

The electron control layer ECL may be disposed on the emission layer EML and the hole control layer HCL. The electron control layer ECL may be commonly disposed in the light-emitting region PA and the non-light-emitting region NPA. The electron control layer ECL may include, for example, an electron transportation layer and an electron injection layer.

The second electrode CE may be disposed on the electron control layer ECL. The second electrode CE may be commonly disposed to the pixels PX. The layers from the buffer layer BFL to the light-emitting element OLED may be defined as a pixel layer.

The thin film encapsulation layer TFL may be disposed on the light-emitting element OLED. The thin film encapsulation layer TFE may be disposed on the second electrode CE and cover the pixel PX. The thin film encapsulation layer TFE may include, for example, at least two inorganic layers and an organic layer between the inorganic layers. The inorganic layers may protect the pixel PX from, for example, moisture/oxygen. The organic layer may protect the pixel PX from foreign substances such as, for example, dust particles.

A first voltage may be applied to the first electrode AE through the transistor TR, and a second voltage having a lower level than the first voltage may be applied to the second electrode CE. Excitons may be formed by the coupling of the holes and electrons which are injected into the emission layer EML, and the light-emitting element OLED may emit light while the excitons transition to a ground state.

Figure 8:
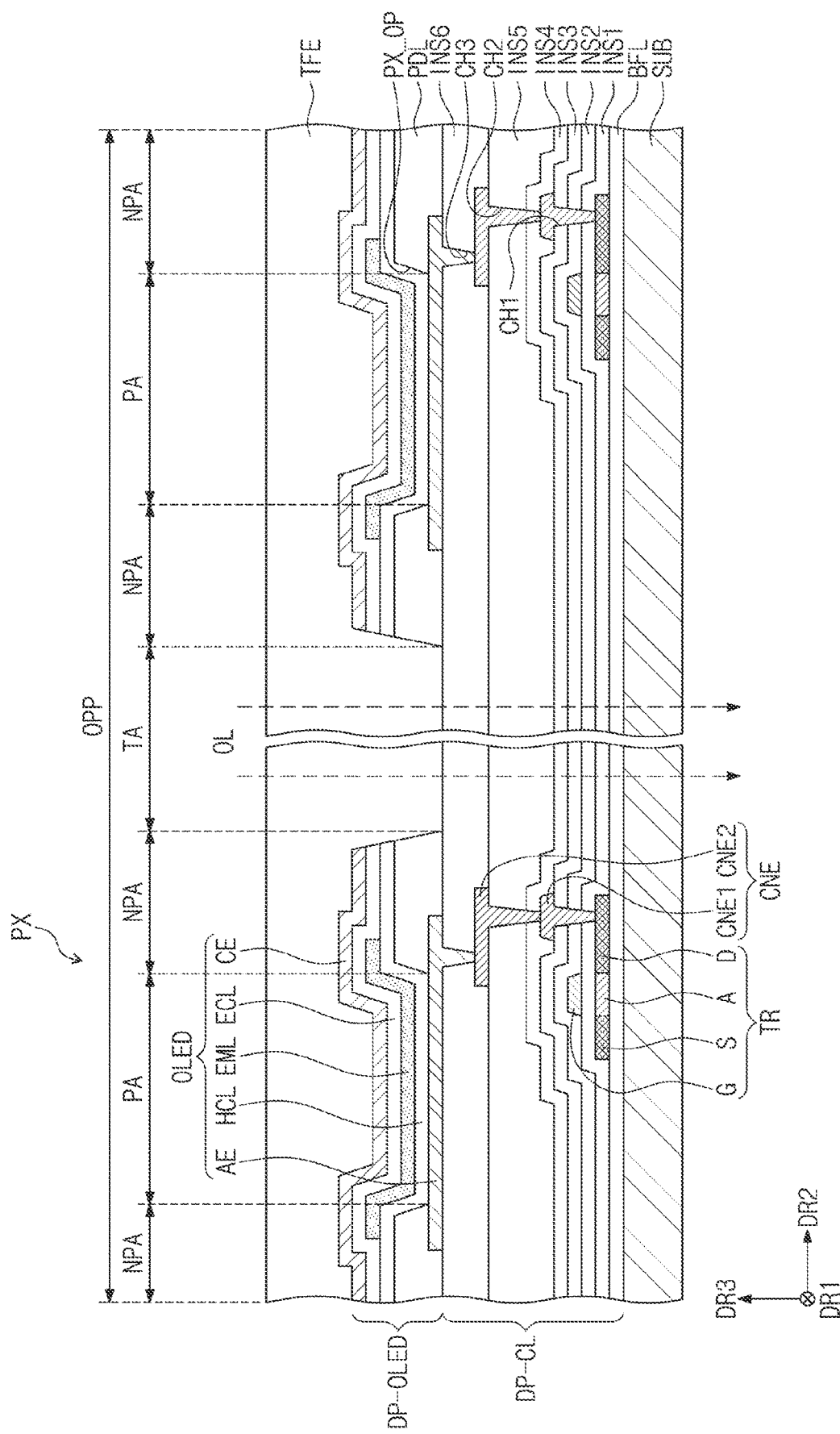
FIG. 8 is a view exemplarily illustrating any one transmissive region disposed in the optical part illustrated in FIG. 6, and cross-sections of pixels disposed with the transmissive region therebetween, according to an embodiment of the inventive concept.

FIG. 8 is a view illustrating any one transmissive region disposed in the optical part illustrated in FIG. 6, and cross-sections of pixels disposed with the transmissive region therebetween, according to an embodiment of the inventive concept.

Referring to FIG. 8, a transmissive region TA may be disposed between pixels PX. The configuration of the pixels PX may be substantially the same as that of the pixels PX illustrated in FIG. 7. Thus, for convenience of explanation, a further description thereof will be omitted.

In an embodiment, the light-emitting element OLED is not disposed in the transmissive region TA. In an embodiment, the pixel defining film PDL is not disposed in the transmissive region TA. The thin film encapsulation layer TFE may be disposed on the sixth insulating layer INS6. Since the light-emitting element OLED is not disposed in the transmissive region TA, the light transmittance of the transmissive region RA may be increased. External light OL may be provided to the functional elements FE through the transmissive region TA.

Referring to FIGS. 4, 6 and 8, external light OL is provided to the functional elements FE through the optical parts OPP, and an external image may be captured by the functional elements FE. Accordingly, the resolutions of the optical parts OPP may affect the sharpness of the image captured by the functional elements FE. The resolution may be defined as the degree of sharpness achieved by an optical mechanism. In an embodiment of the inventive concept, the resolutions of the optical parts OPP may be measured by using the resolution measurement apparatus RMA.

Figure 9:
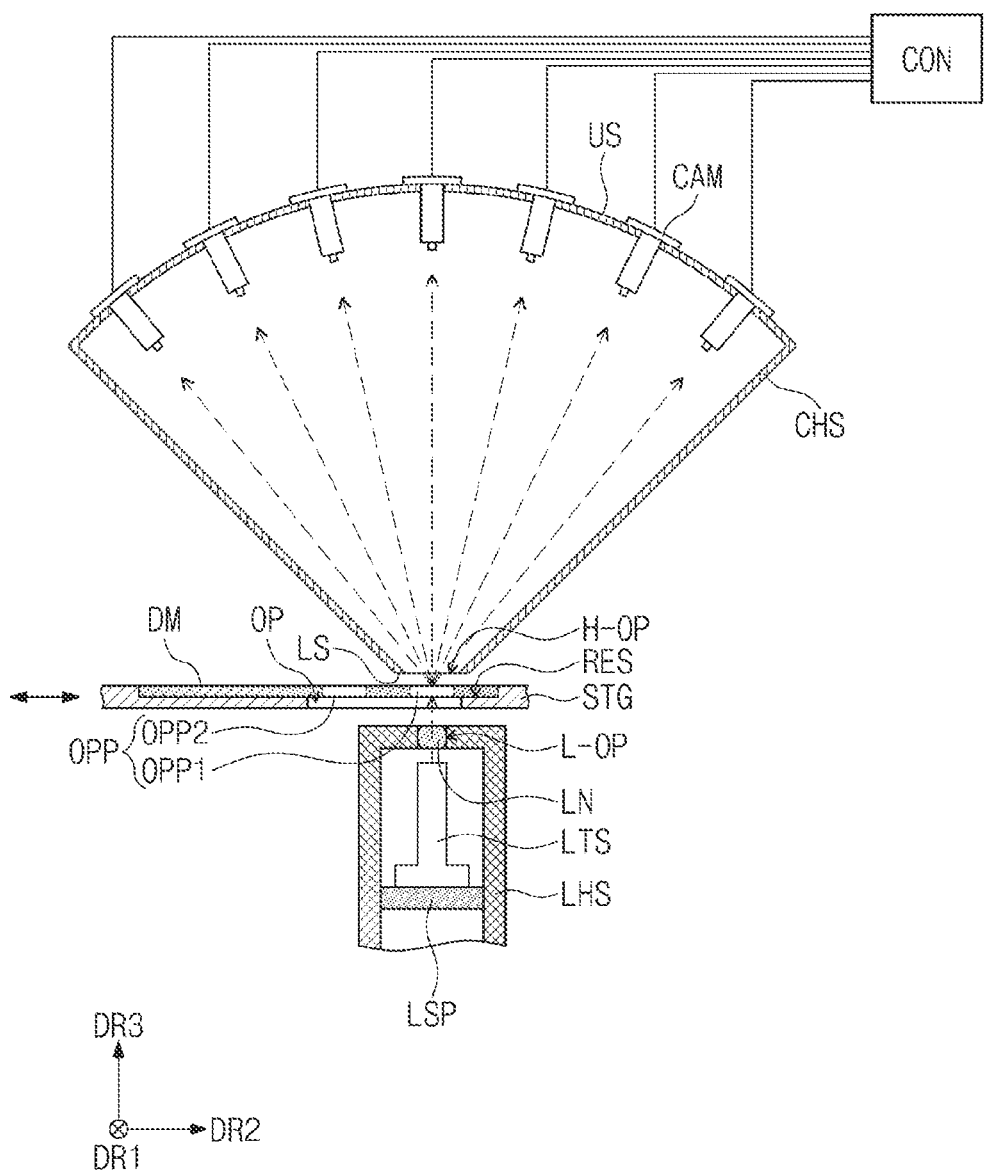
FIGS. 9 to 11 are views for describing operations for measuring resolutions of optical parts using the resolution measurement apparatus illustrated in FIG. 1 according to an embodiment of the inventive concept.
Figure 10:
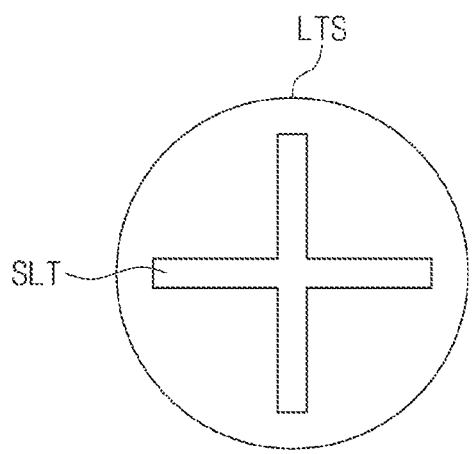
Figure 10:
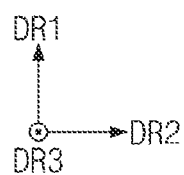
Figure 11:
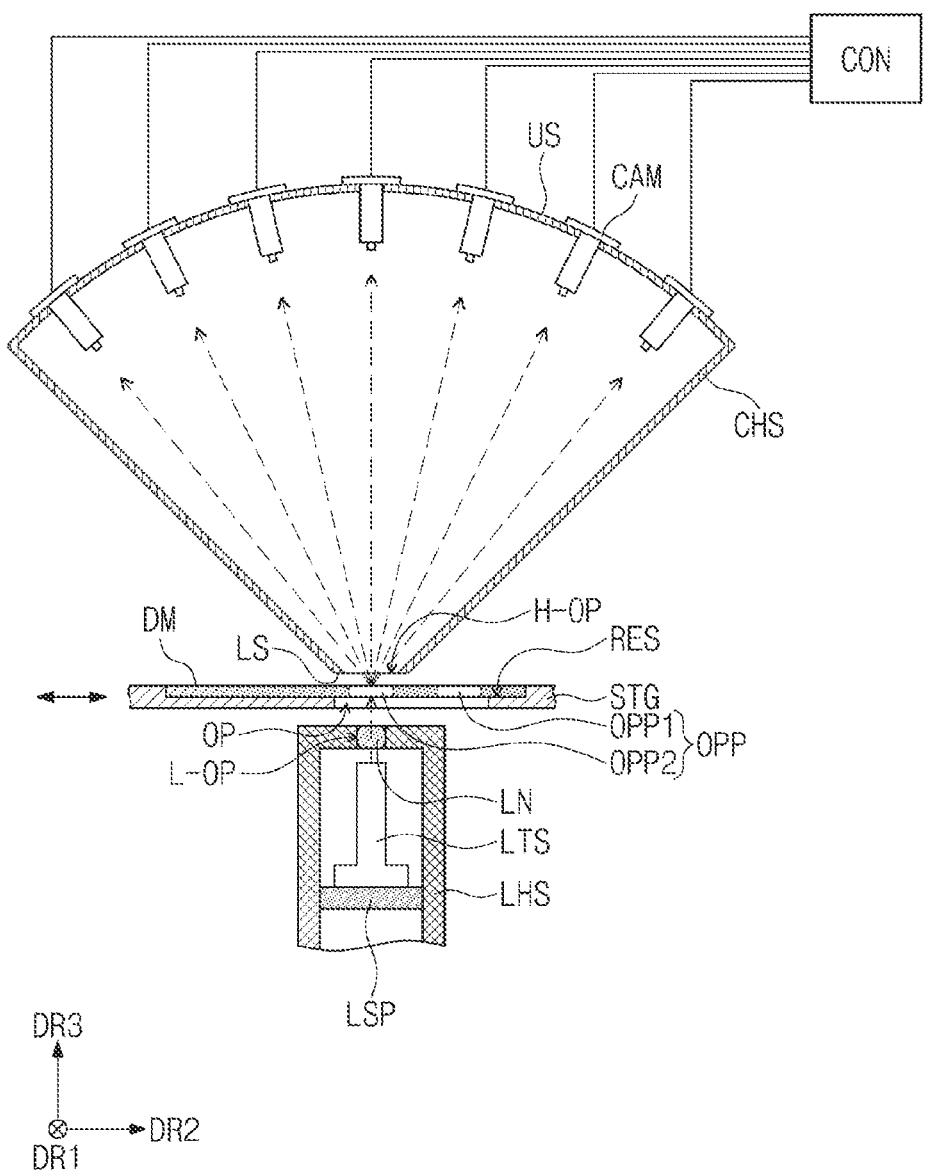

FIGS. 9 to 11 are views for illustrating operations for measuring resolutions of optical parts using the apparatus for measuring resolution illustrated in FIG. 1 according to an embodiment of the inventive concept.

FIGS. 9 to 11 illustrate cross-sections corresponding to FIG. 2 according to an embodiment of the inventive concept. In FIGS. 9 to 11, the first, second, and third support parts SUP1, SUP2 and SUPS are omitted.

Referring to FIG. 9, the display module DM may be disposed on the stage STG. The display module DM may be disposed in the recess RES. When viewed in a plan view, the optical parts OPP of the display module DM may overlap the opening OP.

Although FIG. 9 illustrates a single opening OP overlapping the optical parts OPP, embodiments of the inventive concept are not limited thereto. For example, according to embodiments, a plurality of openings OP overlapping each of the optical parts OPP may be defined in the stage STG.

As described above, the stage STG may move in the first and second directions DR1 and DR2. When viewed in a plan view, the stage STG may be disposed to move so that the openings OP overlap the lens LN and the light source LTS.

When viewed in a plan view, the stage STG may be disposed to move so that any one optical part OPP firstly overlaps the lens LN. Hereinafter, the optical part OPP that firstly overlaps the lens LN in FIG. 9 is defined as a first optical part OPP1, and the other optical part OPP is defined as a second optical part OPP2. For example, the first optical part OPP1 may overlap the lens LN at a time prior to the second optical part OPP2 overlapping the lens LN.

When viewed in a plan view, the central portion of the first optical part OPP1 may overlap the central portion of the lens LN. For example, the stage STG may move in the first and second directions DR1 and DR2 so that the central portion of the first optical part OPP1 overlaps the central portion of the lens LN.

The opening H-OP is defined in the lower surface LS of the camera housing CHS, and thus, the lower surface LS of the camera housing CHS may be open toward the first optical part OPP1. The lenses of the cameras CAM disposed in the lower portions of the cameras CAM may be disposed toward the first optical part OPP1.

The stage STG may be disposed to move so that the first optical part OPP1 overlaps the lens LN, and thus, the lower surface LS of the camera housing CHS may be disposed above the first optical part OPP1. Accordingly, when viewed in a plan view, the first optical part OPP1 may overlap the opening H-OP.

An angle of view may be defined by the first optical part OPP1. The angle of view may be defined as a viewing angle of a scene captured by the first optical part OPP1. For example, the viewing angle of the scene captured by the camera may be defined as the angle of view.

The camera housing CHS may have a shape corresponding to the angle of view formed by the first optical part OPP1. The cameras CAM may be arranged along the angle of view defined by the first optical part OPP1.

The light generated in the light source LTS may be provided to the cameras CAM through the lens LN and the first optical part OPP1. The lens LN may be an imaging lens, and the image formed by the light provided from the light source LTS may be provided to the cameras CAM by the lens LN. Images are formed on the cameras CAM by the lens LN.

FIG. 10 is a view illustrating a slit formed in an upper surface of a light source according to an embodiment of the inventive concept.

Referring to FIG. 10, a cross-shaped slit SLT may be formed in the upper surface of the light source LTS. Light passes through the slit SLT, and as a result, a slit-like image may be provided to the cameras CAM. Although the slit SLT in the embodiment of FIG. 10 has a cross shape, the shape of the slit SLT according to embodiments is not limited thereto.

Referring again to FIG. 9, the resolution of the first optical part OPP1 may be measured by the cameras CAM. For example, the cameras CAM may be connected to a controller CON (also referred to as a controller circuit), and information captured by the cameras CAM may be provided to the controller CON. The controller CON may measure the resolution of the first optical part OPP1 by using the information captured by the cameras CAM.

The resolution may be measured through a value of a modulation transfer function (MTF). The higher the MTF value, the higher the resolution may be.

Referring to FIG. 11, the stage STG may move and be disposed so that the second optical part OPP2 overlaps the lens LN and the lower surface LS of the camera housing CHS when viewed in a plan view. The central portion of the second optical part OPP2 may overlap the central portion of the lens LN. The light generated in the light source LTS may be provided to the cameras CAM through the lens LN and the second optical part OPP2, and thus, the resolution of the second optical part OPP2 may be measured.

According to embodiments of the inventive concept, a resolution measurement operation may be performed on two optical parts OPP. For example, the stage STG may move in the first and second directions DR1 and DR2, and the resolutions of the optical parts OPP may be measured while two or more optical parts OPP sequentially overlap the lens LN. For example, in response to the stage STG moving in at least one of the first and second directions DR1 and DR2, the central portions of the two or more optical parts OPP may sequentially overlap the central portion of the lens LN.

According to embodiments of the inventive concept, every time the central portions of the optical parts OPP sequentially overlap the central portion of the lens LN, and the optical parts OPP overlap the lens LN, light is provided to the cameras CAM through the optical parts OPP, and the resolutions of the optical parts OPP may be sequentially measured.

Thus, according to embodiments of the inventive concept, the resolutions of the optical parts OPP of a display module DM may be efficiently measured by the resolution measurement apparatus RMA.

A resolution measurement apparatus according to an embodiment of the inventive concept may measure the resolution of an optical part of a display module.

While the present inventive concept has been particularly shown and described with reference to the embodiments thereof, it will be understood by those of ordinary skill in the art that various changes in form and detail may be made therein without departing from the spirit and scope of the present inventive concept as defined by the following claims.

What is claimed is:

1. A resolution measurement apparatus, comprising:
   a stage configured to receive a display module, wherein the display module comprises an optical part,
   wherein the stage comprises an opening that overlaps the optical part, when viewed in a plan view, when the display module is disposed on the stage;
   a plurality of cameras disposed above the stage, and disposed above the display module when the display module is disposed on the stage,
   wherein the plurality of cameras are separate and distinct from the display module;
   a light source disposed under the stage,
   wherein the light source overlaps the opening when viewed in the plan view; and
   a lens disposed between the light source and the stage,
   wherein the lens overlaps the opening when viewed in the plan view,
   wherein the optical part overlaps the lens, when viewed in the plan view, when the display module is disposed on the stage; and
   a controller configured to measure a resolution of the optical part by using information captured through the cameras.

2. The resolution measurement apparatus of claim 1, wherein when viewed in the plan view, a central portion of the optical part overlaps a central portion of the lens.

3. The resolution measurement apparatus of claim 2, wherein
   the stage has a plane defined by a first direction and a second direction crossing the first direction,
   wherein the resolution measurement apparatus further comprises a movement part configured to move the stage in the first direction and the second direction, and
   the central portion of the optical part overlaps the central portion of the lens in response to the stage moving in at least one of the first and second directions.

4. The resolution measurement apparatus of claim 3, wherein
   the optical part is one of a plurality of optical parts, and
   the central portions of the plurality of optical parts sequentially overlap the central portion of the lens in response to the stage moving in at least one of the first and second directions.

5. The resolution measurement apparatus of claim 1, wherein lenses of the cameras face the optical part.

6. The resolution measurement apparatus of claim 5, wherein the cameras are arranged along an angle of view defined by the optical part.

7. The resolution measurement apparatus of claim 1, further comprising:
   a camera housing having a fan shape extending between a lower portion of the camera housing and an upper portion of the camera housing, disposed above the stage, and configured to accommodate the cameras,
   wherein an upper surface of the camera housing is curved, and the cameras are disposed along the upper surface of the camera housing.

8. The resolution measurement apparatus of claim 7, wherein
   a lower surface of the camera housing is open toward the optical part, and
   when viewed in the plan view, the lens overlaps the lower surface of the camera housing.

9. The resolution measurement apparatus of claim 1, further comprising:
   a lens housing configured to accommodate the lens and the light source,
   wherein the lens is fixed to an upper end of the lens housing, and the light source is disposed under the lens in the lens housing.

10. The resolution measurement apparatus of claim 1, wherein the stage comprises a recess defined in an upper surface of the stage, the opening is disposed in the recess, and recess is configured to receive the display module.

11. A resolution measurement method, comprising:
    disposing a display module on a stage,
    wherein an optical part of the display module overlaps an opening of the stage when viewed in a plan view;

overlapping the optical part with a lens disposed under the stage;

generating a light from a light source disposed under the lens;

providing the light to a plurality of cameras disposed above the stage through the lens and the optical part, wherein the plurality of cameras are disposed above the display module when the display module is disposed on the stage, wherein the plurality of cameras are separate and distinct from the display module; and measuring a resolution of the optical part by using information captured through the cameras.

12. The resolution measurement method of claim 11, wherein overlapping the optical part with the lens comprises moving the stage, and a central portion of the optical part overlaps a central portion of the lens in response to moving the stage.

13. The resolution measurement method of claim 11, further comprising:

sequentially overlapping central portions of a plurality of optical parts with a central portion of the lens, wherein the optical part is one of the plurality of optical parts;

providing the light to the cameras through the lens and the optical parts when the optical parts overlap the lens; and sequentially measuring resolutions of the optical parts.

14. The resolution measurement method of claim 11, wherein the cameras are arranged along an angle of view defined by the optical part, and lenses of the cameras face the optical part.

15. The resolution measurement method of claim 11, wherein a camera housing configured to accommodate the cameras has a fan shape and is disposed above the stage, and an upper surface of the camera housing is curved, and the cameras are disposed along the upper surface of the camera housing.

16. The resolution measurement method of claim 15, further comprising:

disposing a lower surface of the camera housing above the optical part, wherein the lower surface of the camera housing is open toward the optical part, and the lens overlaps the lower surface of the camera housing when viewed in the plan view.

17. The resolution measurement method of claim 11, wherein disposing the display module on the stage comprises disposing the display module in a recess defined in an upper surface of the stage, and the opening is disposed in the recess.

18. The resolution measurement method of claim 11, wherein the optical part comprises:

a plurality of transmissive regions; and a plurality of pixels between the transmissive regions, wherein the display module further comprises:

a display region disposed around the optical part and comprising the pixels; and a non-display region around the display region, wherein the pixels display an image, and the transmissive regions transmit an external light.

* * * * *